(12) United States Patent
Chang et al.

(10) Patent No.: US 11,808,599 B2
(45) Date of Patent: Nov. 7, 2023

(54) ROUTE RECORDING WITH REAL-TIME ANNOTATION AND RE-DISPLAY SYSTEM

(71) Applicant: GM Global Technology Operations LLC, Detroit, MI (US)

(72) Inventors: Kai-Han Chang, Madison Heights, MI (US); Thomas A. Seder, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 35 days.

(21) Appl. No.: 17/534,987

(22) Filed: Nov. 24, 2021

(65) Prior Publication Data

US 2023/0160715 A1 May 25, 2023

(51) Int. Cl.
*G01C 21/36* (2006.01)
*H04W 4/46* (2018.01)

(52) U.S. Cl.
CPC ..... *G01C 21/3673* (2013.01); *G01C 21/3602* (2013.01); *G01C 21/365* (2013.01); *G01C 21/3608* (2013.01); *G01C 21/3647* (2013.01); *G01C 21/3697* (2013.01); *H04W 4/46* (2018.02)

(58) Field of Classification Search
None
See application file for complete search history.

(56) References Cited

U.S. PATENT DOCUMENTS

| 10,427,602 B1 | 10/2019 | Bertollini et al. |
| 2003/0182052 A1 | 9/2003 | DeLorme et al. |
| 2004/0204851 A1 * | 10/2004 | Fukuyasu ........... G01C 21/3608 701/487 |
| 2007/0067104 A1 * | 3/2007 | Mays ................. G01C 21/3647 701/437 |
| 2011/0102562 A1 | 5/2011 | Johnson, Jr. et al. |
| 2011/0102563 A1 | 5/2011 | Johnson, Jr. et al. |

(Continued)

FOREIGN PATENT DOCUMENTS

CN 106767887 A 5/2017

OTHER PUBLICATIONS

U.S. Appl. No. 17/534,982, filed Nov. 24, 2021.
U.S. Appl. No. 17/539,365, filed Dec. 1, 2021.
U.S. Appl. No. 17/542,899, filed Dec. 6, 2021.

*Primary Examiner* — Anne Marie Antonucci
*Assistant Examiner* — Kyle S Park
(74) *Attorney, Agent, or Firm* — Vivacqua Crane PLLC (57) ABSTRACT

A route recording with real-time annotation and re-display system includes a first automobile vehicle having one or more camera systems. An imaging display device defining a head-up display (HUD) is positioned within the first automobile vehicle and receives camera imaging data from the one or more camera systems. The HUD includes a video display screen presenting the camera imaging data either in real-time or re-displayed from a pre-recorded image file. A microphone array receives vehicle operator voice data of a first operator of the first automobile vehicle. An annotated-recorded-route is created by adding a user input of the first operator of the first automobile vehicle including the voice data. The annotated-recorded-route identifies specific coordinates or locations along a travel route driven by the automobile vehicle through the voice data after activating recording of the camera imaging data.

16 Claims, 6 Drawing Sheets

(56) References Cited

U.S. PATENT DOCUMENTS

| | | |
|---|---|---|
| 2011/0181757 A1 | 7/2011 | Fish et al. |
| 2013/0245939 A1* | 9/2013 | Chang .................... G01C 21/26 |
| | | 701/527 |
| 2014/0156188 A1* | 6/2014 | Hart ................... G01C 21/3484 |
| | | 701/538 |
| 2015/0192420 A1* | 7/2015 | Watters .............. G01C 21/3407 |
| | | 701/410 |
| 2015/0211874 A1* | 7/2015 | Paek ................. G01C 21/3644 |
| | | 701/526 |
| 2015/0268057 A1* | 9/2015 | Tuukkanen ........ G01C 21/3661 |
| | | 701/516 |
| 2016/0187651 A1 | 6/2016 | Border et al. |
| 2017/0094258 A1 | 3/2017 | Cooper |
| 2017/0276497 A1* | 9/2017 | Andrew ............. G01C 21/3423 |
| 2019/0179331 A1* | 6/2019 | Heo ................... G01C 21/3644 |
| 2020/0184849 A1 | 6/2020 | Spence et al. |
| 2020/0371378 A1 | 11/2020 | Makinen et al. |
| 2021/0055549 A1 | 2/2021 | Chang et al. |
| 2021/0112647 A1 | 4/2021 | Coleman |
| 2021/0329892 A1 | 10/2021 | Kozachenok et al. |

* cited by examiner

| TIME-STAMP | LATITUDE | LONGITUDE | TRIGGER? | AUDIO | PICTURE |
|---|---|---|---|---|---|
| 2021 sep 02 15:12:41.211 EST | 42.520772 | -83.047195 | 0 | (EMPTY) | (EMPTY) |
| 2021 sep 02 15:13:41.211 EST | 42.536155 | -83.047753 | 1 | 🔊 | 🖼 |
| ⋮ | ⋮ | ⋮ | 0 | (EMPTY) | (EMPTY) |
| ⋮ | ⋮ | ⋮ | 1 | 🔊 | 🖼 |

ROUTE RECORDING WITH REAL-TIME ANNOTATION AND RE-DISPLAY SYSTEM

INTRODUCTION

The present disclosure relates to recording a travel route of an automobile vehicle.

In automobile vehicle camera systems, an existing map application provides a precise location of known points of interest. There are also times when exploration during a vehicle trip to a destination is worth sharing with family and friends or worth retaining if the vehicle trip will be repeated to re-use data from the vehicle trip. Known route recording and sharing applications allow a user to record and share the route of the vehicle trip with others, however, these applications lack real-time annotation and re-display capability to point out where items of interest are located. The interesting or useful information may not be mentioned in the navigation application.

Thus, while current automobile vehicle camera systems achieve their intended purpose, there is a need for a new and improved camera based recording system.

SUMMARY

According to several aspects, a route recording with real-time annotation and re-display system includes a first automobile vehicle having one or more camera systems. An imaging display device defining a head-up display (HUD) is positioned within the first automobile vehicle and receives camera imaging data from the one or more camera systems. The HUD includes a video display screen presenting the camera imaging data either in real-time or re-displayed from a pre-recorded image file. A microphone array receives vehicle operator voice data of a first operator of the first automobile vehicle. An annotated-recorded-route is created by adding a user input of the first operator of the first automobile vehicle including audio data in the form of the voice data. The annotated-recorded-route identifies specific coordinates or locations along a travel route driven by the automobile vehicle through the voice data after activating recording of the camera imaging data.

In another aspect of the present disclosure, a global positioning system (GPS) generated map identifying the travel route taken by the automobile vehicle.

In another aspect of the present disclosure, the travel route is initiated at a start point of the travel route and concludes with an end point of the travel route, the GPS coordinate data being continuously applied to identify a current location of the first automobile vehicle along the travel route such that the GPS coordinate data is applied to any entry made by the first operator of the first automobile vehicle when creating the annotated-recorded-route.

In another aspect of the present disclosure, a second automobile vehicle having a second operator, the second automobile vehicle adapted to receive the annotated-recorded-route from the first automobile vehicle.

In another aspect of the present disclosure, an augmented reality HUD of the second automobile vehicle presents a highlighted upcoming travel portion of the travel route, wherein as the second automobile vehicle encounters features identified by the first operator of the first automobile vehicle multiple indications are presented on the augmented reality HUD.

In another aspect of the present disclosure, an image screen of the augmented reality HUD presenting the travel route previously taken by the first automobile vehicle and now being driven by the second automobile vehicle.

In another aspect of the present disclosure, travel points of interest to the first operator of the first automobile vehicle presented on the augmented reality HUD of the second automobile vehicle.

In another aspect of the present disclosure, a recording permission request is presented to the first operator requesting if the travel route should be recorded.

In another aspect of the present disclosure, a recording command control wherein the imaging data may be recorded by selection of the recording command by the first operator of the first automobile vehicle.

In another aspect of the present disclosure, a predefined first keyword spoken by the first operator for activating both audio and video recording at any location along the travel route.

According to several aspects, a route recording with real-time annotation and re-display system includes an annotated-recorded-route generated using a global positioning system (GPS) generated map identifying a travel route taken by a first automobile vehicle having a first operator and a set of GPS coordinate data being continuously applied to identify a current location of the first automobile vehicle. A camera system records camera imaging data along the travel route taken by the first automobile vehicle, the annotated-recorded-route being created by adding an input by the first operator including voice data. The annotated-recorded-route identifies specific coordinates or locations along the travel route driven by the first automobile vehicle through the voice data when activating recording of the camera imaging data with the GPS coordinate data being applied to any entry made by the first operator with real-time annotation. A second automobile vehicle includes a second operator wherein the annotated-recorded-route is shared with the second automobile vehicle in a second stage. An augmented reality HUD of the second automobile vehicle displays the annotated-recorded-route to the second operator.

In another aspect of the present disclosure, the augmented reality HUD of the second automobile vehicle is displayed on a windshield of the second automobile vehicle and presents a navigation arrow indicating a direction of travel recommended by the first operator for the second automobile vehicle to take.

In another aspect of the present disclosure, a message presented on the augmented reality HUD of the second automobile vehicle defines at least one of a recommendation of the first operator for food, a sightseeing stop, and a negative review provided by the first operator during the recording of the annotated-recorded-route.

In another aspect of the present disclosure, the annotated-recorded-route is shared via a cell phone application of a cellular phone of the second operator which may then be entered into the second automobile vehicle.

In another aspect of the present disclosure, the annotated-recorded-route is shared by transferring using a data transfer protocol such as a V2V protocol.

In another aspect of the present disclosure, a controller positioned within the automobile vehicle includes data defining the annotated-recorded-route and the camera imaging data from the camera module and the voice data received from the microphone array saved in a memory of, and accessible for future replay from the controller.

In another aspect of the present disclosure, the travel route is initiated at a travel route start point and concludes with a travel route end point, and wherein the travel route represents one or more highways, roadways, streets, bridges, tunnels, and the like between the travel route start point and the travel route end point.

According to several aspects, a method for recording route data with real-time annotation and re-display comprises: generating an annotated-recorded-route using a global positioning system (GPS) generated map identifying a travel route taken by a first automobile vehicle having a first operator; continuously applying a set of GPS coordinate data to identify a current location of the first automobile vehicle; recording camera imaging data using a camera system along the travel route taken by the first automobile vehicle; adding an input by the first operator including voice data to the annotated-recorded-route, such that the annotated-recorded-route identifies specific coordinates or locations along the travel route driven by the first automobile vehicle through the voice data after activating recording of the camera imaging data and applying the GPS coordinate data to any entry made by the first operator with real-time annotation; sharing the annotated-recorded-route with a second automobile having a second operator; and displaying the annotated-recorded-route to the second operator using an augmented reality HUD of the second automobile vehicle.

In another aspect of the present disclosure, the method further includes initiating a start recording step when a first keyword is received from the first operator wherein operation of the camera system is initiated to begin collecting the camera imaging data from a front directed camera, and operation of a microphone array is initiated to receive and record the voice data.

In another aspect of the present disclosure, the method further includes conducting an annotation step to annotate a GPS location together with the camera imaging data from the camera system and the voice data from the microphone array Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
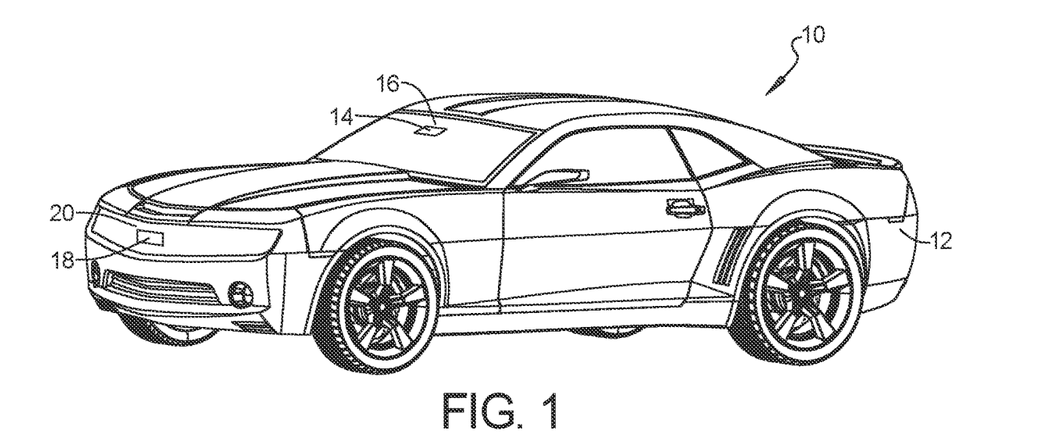
FIG. 1 is a left side elevational view of an automobile vehicle having a route recording with real-time annotation and re-display system according to an exemplary aspect.

Referring to FIG. 1, a route recording with real-time annotation and re-display system 10 is provided in a first automobile vehicle 12 having one or more camera systems. A camera system which may define a first front directed camera module 14 may be positioned in a rearview mirror housing 16 within a passenger compartment of the first automobile vehicle 12. An alternate camera location for a second front directed camera module 18 may be in a front grill 20 of the first automobile vehicle 12. Other locations on or in the first automobile vehicle 12 for the camera system or the camera module 14 may also be selected. In the discussion that follows the first front directed camera module 14 is described in greater detail, however the discussion applies equally to operation of the second front directed camera module 18 if the second front directed camera module 18 or other camera module is used.

Referring to FIG. 2 and again to FIG. 1, the camera system defining the first front directed camera module 14 of the route recording with real-time annotation and re-display system 10 described in reference to FIG. 1 generates and sends camera imaging data to an imaging display device such as a head-up display (HUD) 22 positioned within the first automobile vehicle 12. The HUD 22 may be positioned in a front dashboard 24 and may include a video display screen 26 presenting the camera imaging data either in real-time or re-displayed from a pre-recorded image file described below. According to several aspects the head-up display (HUD) 22 may be replaced by a head-down display and further discussion of the head-up display (HUD) 22 herein applies equally to a head-down display.

Figure 2:
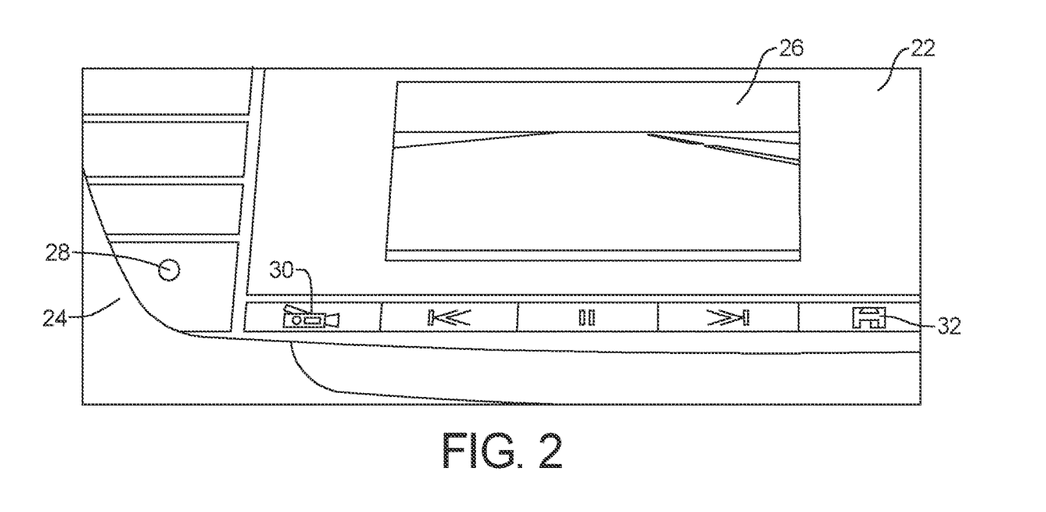
FIG. 2 is an end elevational view looking forward of a head-up display of the automobile vehicle of FIG. 1.

The front directed camera module 14 camera imaging data and the route recording with real-time annotation and re-display system 10 provide for integration of the imaging data from the front directed camera module 14 together with audio data received from a microphone array 28 in the form of vehicle user voice data when selected by a user such as an operator or a passenger of the first automobile vehicle 12. The imaging data may be recorded by selection of a recording command control 30 and the imaging data together with the voice data may be combined with an existing route recording application to add more information to the recorded route. The user is able to create an annotated-recorded-route 32 by adding personal input including the user voice data at specific coordinates or locations through the voice data by activating the recording command control 30 and by activating recording of the camera imaging data generated by the front camera module 14 using the recording command control 30. The user is thereafter able to recall the annotated-recorded-route 32 and to share the annotated-recorded-route 32 with other travelers, allowing the other travelers to feel like the user is traveling with him/her thereby making the other traveler trip more interesting.

Referring to FIG. 3 and again to FIGS. 1 and 2, the route recording with real-time annotation and re-display system 10 may be operated in three phases or stages. These include in a first stage 34 the creation of the annotated-recorded-route 32 using a global positioning system (GPS) generated map 36 identifying a route 38 taken by the first automobile vehicle 12. The route 38 may be initiated a route start point 40 and conclude with a route end point 42. The route 38 represents one or more highways, roadways, streets, bridges, tunnels, and the like between the route start point 40 and the route end point 42. GPS coordinate data is continuously applied to identify a current location of the first automobile vehicle 12 along the route 38 such that the GPS coordinate data is applied to any entry made by the user into the route recording with real-time annotation and re-display system 10.

Figure 3:
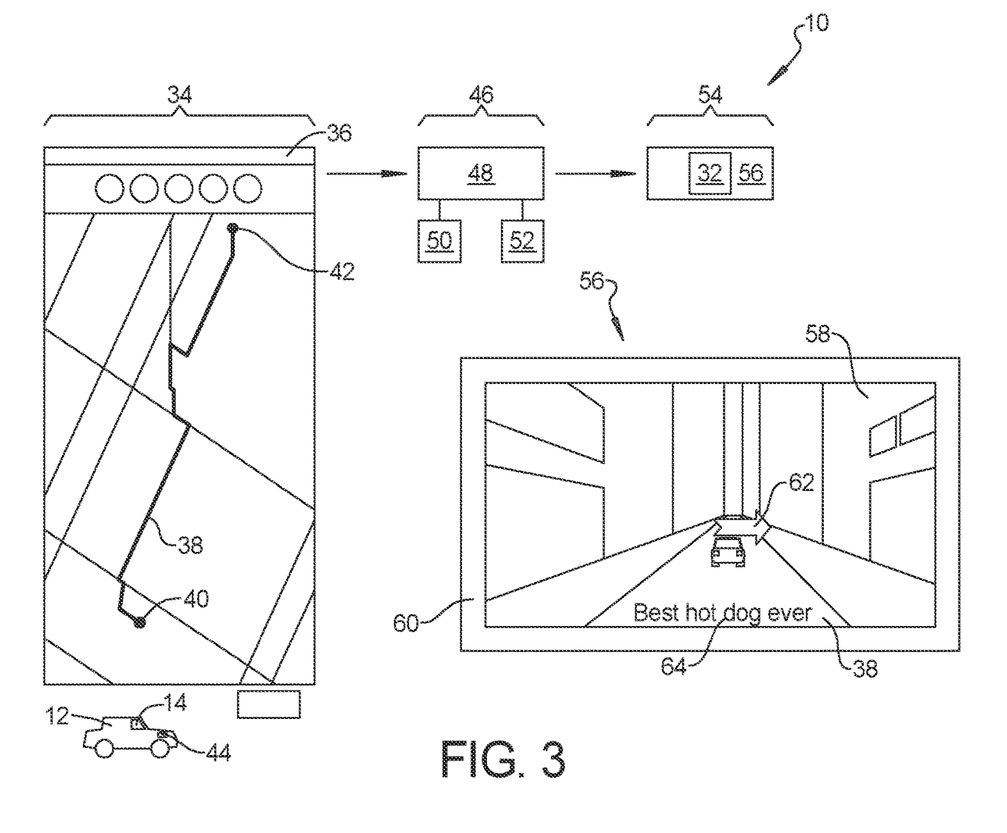
FIG. 3 is a flow diagram of three operational stages for using the system of FIG. 1.

Data defining the annotated-recorded-route 32, as well as the camera imaging data from the first front directed camera module 14 and the voice data received from the microphone array 28 is forwarded to, saved in a memory of, and accessible for future replay from a controller 44 positioned within the first automobile vehicle 12. According to several aspects, the controller 44 is a non-generalized, electronic control device having a preprogrammed digital computer or processor, memory or non-transitory computer readable medium used to store data such as control logic, software applications, instructions, computer code, data, lookup tables, etc., and a transceiver or input/output ports. The computer readable medium includes any type of medium capable of being accessed by a computer, such as read only memory (ROM), random access memory (RAM), a hard disk drive, a compact disc (CD), a digital video disc (DVD), or any other type of memory. The non-transitory computer readable medium excludes wired, wireless, optical, or other communication links that transport transitory electrical or other signals. The non-transitory computer readable medium includes media where data can be permanently stored and media where data can be stored and later overwritten, such as a rewritable optical disc or an erasable memory device. Computer code includes any type of program code, including source code, object code, and executable code.

In a second stage 46 the data defining the annotated-recorded-route 32 may be shared with one or more other parties including with a second operator of a second automobile vehicle 48. Data sharing may be via a cell phone application 50 of a cellular phone of the second operator which may then be entered into a route recording with real-time annotation and re-display system of the second automobile vehicle 48. The data defining the annotated-recorded-route 32 may also be transferred using a data transfer protocol such as a V2V protocol 52. The V2V protocol 52 is defined as "vehicle-to-vehicle" communication which is an automobile technology that allows multiple automobiles to "talk" to each other. V2V communications define an ad hoc network on roadways.

In a third stage 54 the annotated-recorded-route 32 after being imported to at least the second automobile vehicle 48 is displayed on an augmented reality HUD 56 of the second automobile vehicle 48. An image screen 58 of the HUD 56 presents the route 38 previously taken by the first automobile vehicle 12 and now being driven by the second automobile vehicle 48. The HUD 56 may be displayed on a windshield 60 of the second automobile vehicle 48 and may present a navigation arrow 62 indicating a recommended direction of travel for the second automobile vehicle 48. A message 64 may also be presented on the HUD 56 such as a recommendation for food, a good sightseeing stop, or a negative review provided by the user of the first automobile vehicle 12 during the recording of the annotated-recorded-route 32.

Figure 4:
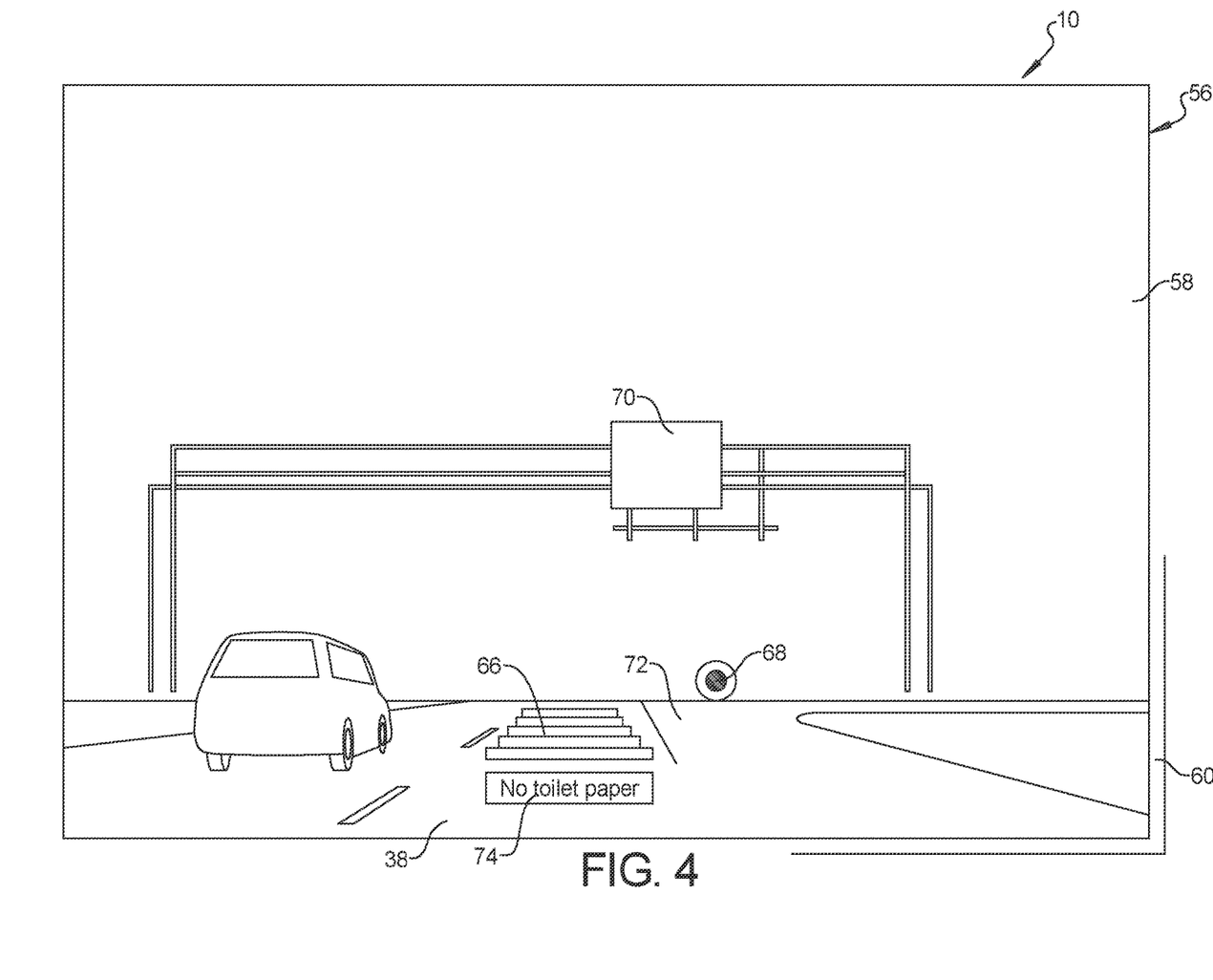
FIG. 4 is an end elevational view looking forward of a head-up display of a second automobile vehicle using the system of FIG. 1.

Referring to FIG. 4, as the second automobile vehicle travels the route 38 the image screen 58 of the HUD 56 presents a highlighted upcoming travel portion 66 of the route 38. As the second automobile vehicle 48 encounters features identified by the user of the first automobile vehicle 12 multiple indications may be presented. These may include a symbol 68 which may be for example a negative report symbol indicating for example that an upcoming rest area identified by a rest area sign 70 which is accessible via an exit 72 may be undesirable, indicated by a negative message 74. Sufficient time is provided for the operator of the second automobile vehicle 48 to decide if the exit 72 should be taken to use the rest area identified and to follow any advice provided by the annotated-recorded-route 32.

Figure 5:
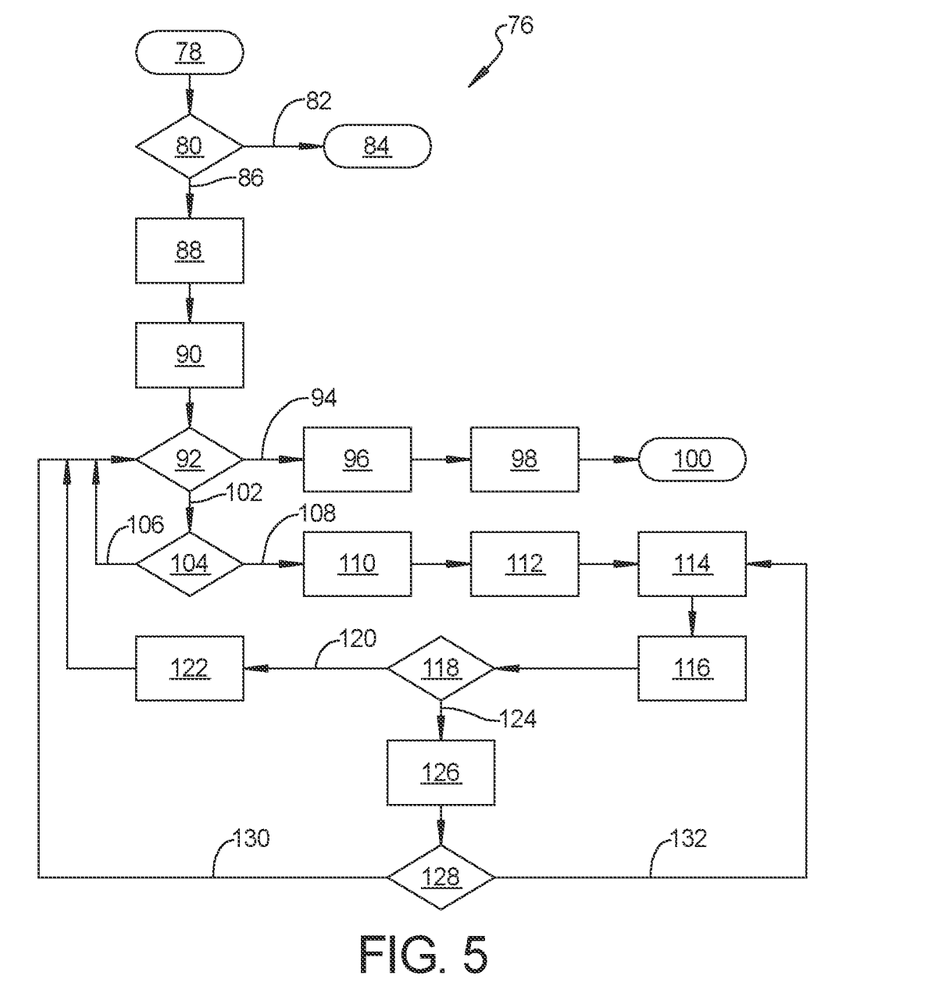
FIG. 5 is a flow diagram of method steps for operating the system of FIG. 1.

Referring to FIG. 5, a flow diagram 76 presents method steps to use the route recording with real-time annotation and re-display system 10. In a system initiation step 78 a trip start is initiated. In an allowance query 80 the user makes an election whether to record the route 38. If the user elects "NO" 82 not to record the route 38, the program ends at a first end step 84. If the user elects "YES" 86 to record the route 38, in a first creation step 88 a data log is created which includes items such as a timestamp, a latitude, a longitude, a trigger index, an audio file and a picture file. Following the first creation step 88, a start recording step 90 is performed wherein the latitude and the longitude are recorded with a predefined time period and saved in a memory. A trip end identification query 92 is then conducted. If a trip end signal 94 is received, a stop recording step 96 is conducted wherein recording of the GPS coordinates is stopped. Following the stop recording step 96 in a transfer step 98 a data log of the trip is transferred to a database, for example to the Internet. After completion of the transfer step 98 the program ends at a second end step 100.

During the trip end identification query 92, if a "NO" trip end signal 102 is identified a user annotation trigger query 104 is performed to identify if the user wishes to trigger an annotation. If the user elects "NO" 106 not to trigger an annotation the program returns to the trip end identification query 92. If the user elects "YES" 108 to trigger an annotation the program moves to a second creation step 110. A "trigger" and confirmation for the user annotation trigger query 104 may be via a virtual assistant such as a verbal command, via operation of a mechanical switch or via a gesture recognition. In the second creation step 110 an entry of a current time stamp an a TPS coordinate are created and saved. Following the second creation step 110, in a capture step 112 operation of a vehicle camera such as the first front directed camera module 14 is initiated to capture a picture of the present route position and stored in the created entry. In a following notification step 114 the system notifies the user about the recorded route position and starts an audio recording having a predefined recording duration. At the end of the predefined recording duration in a stop recording step 116 the system stops the audio recording an automatically replays the audio recording for the user to hear.

In a confirmation query 118, the user is queried to confirm if the audio recording is satisfactory. If the user elects "YES" 120 in a storage step 122 the recorded audio is stored to the same location or cord as the GPS data and the picture data. A "trigger" and confirmation to the confirmation query 118 may be the same as noted above in response to the user annotation trigger query 104. If the user elects "NO" 124 to the confirmation query 118 in an erasure step 126 the audio recording is erased. Following the erasure step 126 in a re-record query 128 the user is queried if a new audio recording is requested. If the user elects "NO" 130 to the re-record query 128 the program returns to the trip end identification query 92. If the user elects "YES" 132 to the re-record query 128 the program returns to the notification step 114.

Figure 6:
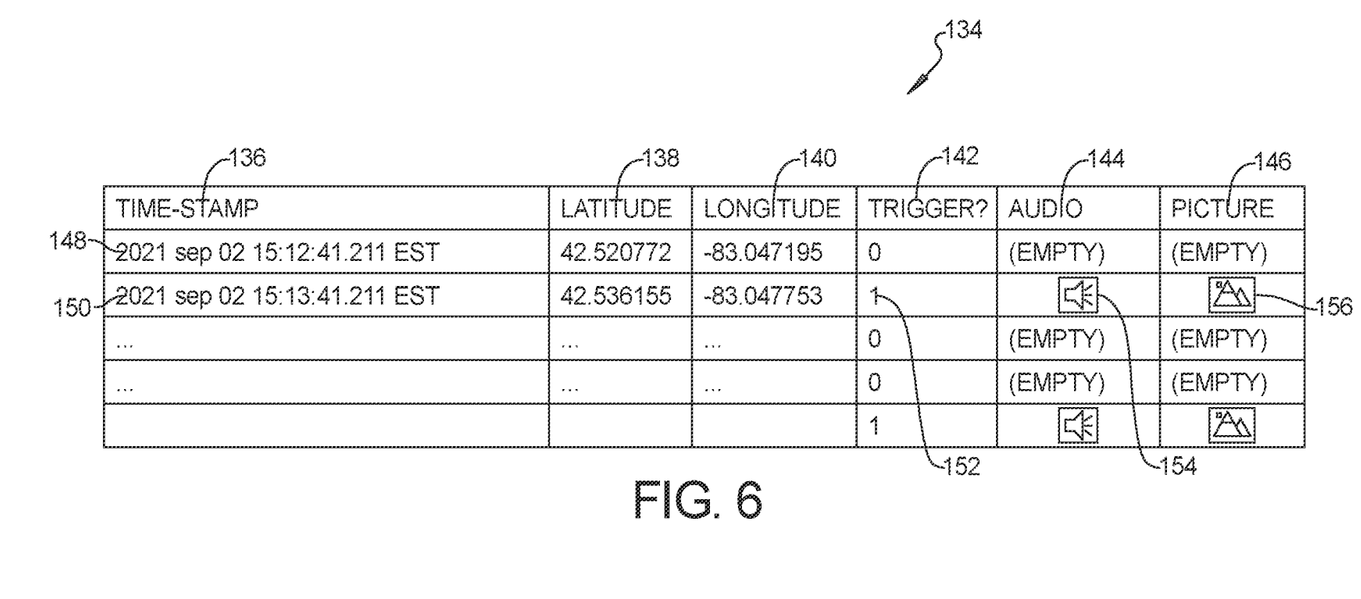
FIG. 6 is a datalog table recorded and saved during an exemplary operation of the system of FIG. 1.
Figure 7:
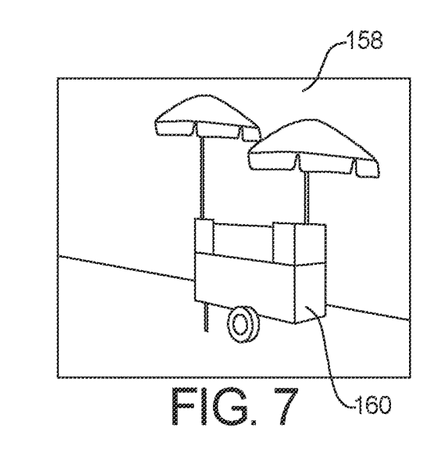
FIG. 7 is an elevational view of a street food vendor captured using the camera of the system of FIG. 1.
Figure 8:
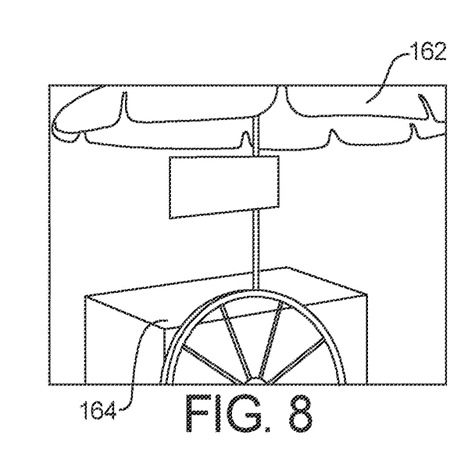
FIG. 8 is an elevational view of a street food vendor captured using the camera of the system of FIG. 1.
Figure 9:
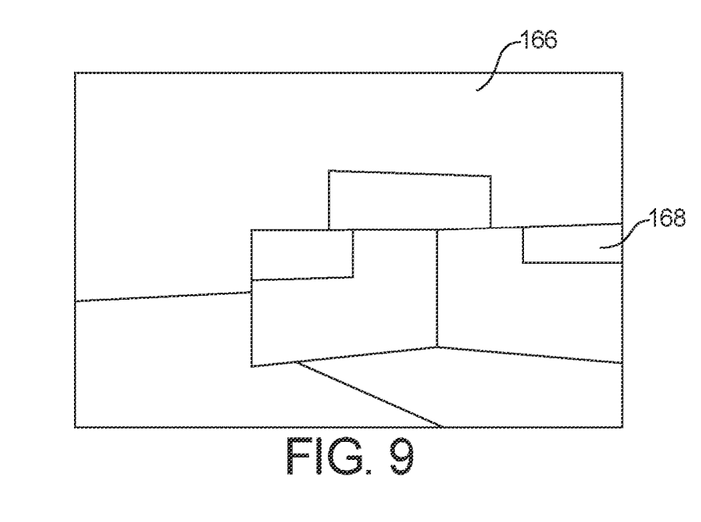
FIG. 9 is an elevational view of an off-roadway vegetable stand captured using the camera of the system of FIG. 1.

Referring to FIG. 6 and again to FIG. 5, an exemplary datalog 134 may be populated upon the occurrence of selections made by the user as discussed above in reference to FIG. 5. The datalog 134 includes a time-stamp column 136, a latitude column 138, a longitude column 140, a trigger present column 142, an audio file status column 144 and a picture file status column 146. Initially, after the user elects "YES" 86 to record the route 38 in the first creation step 88 identified above the data log 134 is created which includes items in a first data row 148 including the time-stamp, the latitude and the longitude. The trigger present column, the audio file status column 144 and the picture file status column 146 are initially at "0" or identify a status of "empty". At a second time defined by a second data row 150, the time stamp, the latitude and the longitude values have changed, and a "1" is entered in the trigger present column 142 indicating the user has elected to record the trip. An audio symbol 154 is entered in the audio file status column 144 and a video symbol is entered in the picture file status column 146.

Referring generally to FIGS. 7 through 10, exemplary travel points of interest to the user of the first automobile vehicle 12 are shown as presented on the HUD 56 of the second automobile vehicle 48. With specific reference to FIG. 7, a camera image 158 of an unnamed food stand 160 identified having for example good food was saved and transferred to the second automobile vehicle 48. A voice recording providing additional information may also be played.

Referring to FIG. 8 and again to FIGS. 2 and 3, a camera image 162 of a food stand 164 identified having for example undesirable food quality may be saved, commented on and transferred to the second automobile vehicle 48.

Referring to FIG. 9 and again to FIGS. 2 and 3, a camera image 166 of a fruit stand 168 having what is deemed by the first operator of the first automobile vehicle 12 the best fruit prices on the route 38 may be saved, commented on and transferred to the second automobile vehicle 48.

Figure 10:
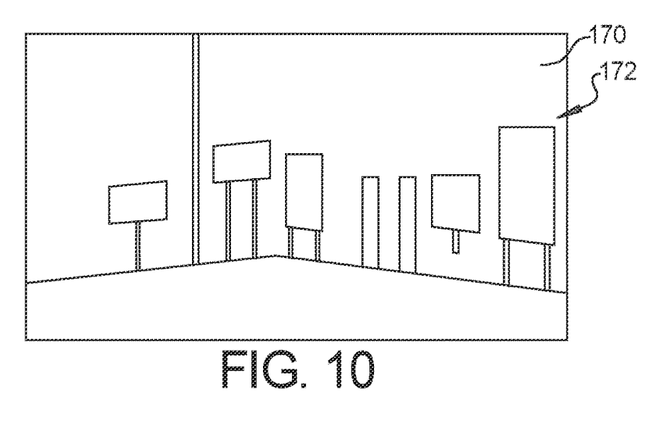
FIG. 10 is an elevational view of an off-roadway shopping store parking area captured using the camera of the system of FIG. 1.

Referring to FIG. 10, a camera image 170 of a roadside store 172 having what is deemed the best clothing prices on the route 38 may be saved, commented on and transferred to the second automobile vehicle 48.

A route recording with real-time annotation and re-display system 10 of the present disclosure includes audio input to allow the user to provide a user opinion verbally. The user may activate a front camera recording function at a common point of interest or at a non-typical point of interest. The audio and video recording annotates the recorded route. The annotated-recorded-route may then be shared with other users and displayed on an information display or HUD of the other user automobile vehicles.

With respect to the controller 44 discussed above, the memory may include a computer readable medium (also referred to as a processor readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an electronic control unit (ECU). Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a random access memory (RAM), a PROM, an erasable programmable read-only memory (EPROM), a FLASH electrically erasable programmable read-only memory (EEPROM), any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the Procedural Language extensions to the Structured Query Language (PL/SQL) mentioned above.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain implementations, and should in no way be construed so as to limit the claims.

A route recording with real-time annotation and re-display system 10 of the present disclosure offers several advantages. These include the integration of existing route-recording applications with the front camera module and microphone array. This integration enables real-time annotation capability during route-recording. The recorded route with audio and video annotation may subsequently be shared with other users and displayed in an augmented reality format.

Accordingly, it is to be understood that the above description is intended to be illustrative and not restrictive. Many implementations and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future implementations. In sum, it should be understood that the invention is capable of modification and variation and is limited only by the following claims.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A route recording with real-time annotation and re-display system, comprising:
   a first automobile vehicle having one or more camera systems;
   an imaging display device defining a head-up display (HUD) or a head-down display positioned within the first automobile vehicle and receiving camera imaging data from the one or more camera systems, the HUD or the head-down display having a video display screen presenting the camera imaging data either in real-time or re-displayed from a pre-recorded image file;
   a microphone array receiving voice data of a first operator of the first automobile vehicle;
   an annotated-recorded-route created by adding a user input of the first operator of the first automobile vehicle including the voice, the annotated-recorded-route identifying specific coordinates or locations along a travel route driven by the first automobile vehicle including the voice data after activating recording of the camera imaging data to generate annotated features along the annotated-recorded-route; and
   a second automobile vehicle having a second operator, the second automobile vehicle adapted to receive the annotated-recorded-route from the first automobile vehicle, the second automobile vehicle having an augmented reality HUD presenting a highlighted upcoming travel portion of the travel route overlayed on a windshield of the second automobile vehicle, wherein as the second automobile vehicle encounters the annotated features identified by the first operator of the first automobile vehicle, a symbol on the augmented reality HUD of the second automobile vehicle is overlayed on an object viewable through the windshield of the second automobile vehicle, wherein the symbol corresponds to an annotation of the annotated features identified by the first operator.

2. The system of claim 1, further including a global positioning system (GPS) generated map identifying the travel route taken by the first automobile vehicle.

3. The system of claim 2, wherein the travel route is initiated at a start point of the travel route and concludes with an end point of the travel route, wherein GPS coordinate data available from the global positioning system is continuously applied to identify a current location of the first automobile vehicle along the travel route such that the GPS coordinate data is applied to any entry made by the first operator of the first automobile vehicle when creating the annotated-recorded-route.

4. The system of claim 1, further including travel points of interest to the first operator of the first automobile vehicle presented on the augmented reality HUD of the second automobile vehicle.

5. The system of claim 1, further including a recording permission request presented to the first operator requesting if the travel route should be recorded.

6. The system of claim 1, further including a recording command control wherein the camera imaging data may be recorded by selection of the recording command by the first operator of the first automobile vehicle.

7. The system of claim 1, further including a predefined first keyword spoken by the first operator to activate both audio and video recording at any location of the first automobile vehicle along the travel route.

8. A route recording with real-time annotation and re-display system, comprising:
   an annotated-recorded-route generated using a global positioning system (GPS) generated map identifying a travel route taken by a first automobile vehicle having a first operator and a set of GPS coordinate data being continuously applied to identify a current location of the first automobile vehicle;
   a camera system recording camera imaging data along the travel route taken by the first automobile vehicle, the annotated-recorded-route being created by adding an audio data input by the first operator including voice data, the annotated-recorded-route identifying specific coordinates or locations along the travel route driven by the first automobile vehicle through the voice data when activating recording of the camera imaging data, with the GPS coordinate data being applied to any entry made by the first operator in real-time to generate annotated features along the annotated-recorded-route;
   a second automobile vehicle having a second operator wherein the annotated-recorded-route is shared with the second automobile vehicle; and
   an augmented reality HUD of the second automobile vehicle displaying the annotated-recorded-route to the second operator, wherein the augmented reality HUD of the second automobile vehicle presenting a highlighted upcoming travel portion of the travel route overlayed on a windshield of the second automobile vehicle, wherein as the second automobile vehicle encounters the annotated features identified by the first operator of the first automobile vehicle, a symbol on the augmented reality HUD of the second automobile vehicle is overlayed on an object viewable through the windshield of the second automobile vehicle, wherein the symbol corresponds to an annotation of the annotated features identified by the first operator.

9. The system of claim 8, wherein the symbol includes a message presented on the augmented reality HUD of the second automobile vehicle defining at least one of a recommendation of the first operator for food, a sightseeing stop, and a negative review provided by the first operator during the recording of the annotated-recorded-route.

10. The system of claim 8, wherein the annotated-recorded-route is shared via a cell phone application of a cellular phone of the second operator which may then be entered into the second automobile vehicle.

11. The system of claim 8, wherein the annotated-recorded-route is shared by transferring using a data transfer protocol such as a V2V protocol.

12. The system of claim 8, further including a controller positioned within the second automobile vehicle receiving data defining the annotated-recorded-route and the camera imaging data from the camera system and the voice data received from a microphone array saved in a memory of, and accessible for future replay from the controller.

13. The system of claim 8, wherein the travel route is initiated at a travel route start point and concludes with a travel route end point, and wherein the travel route represents one or more highways, roadways, streets, bridges, and tunnels between the travel route start point and the travel route end point.

14. A method for recording route data with real-time annotation and re-display, comprising:
   generating an annotated-recorded-route using a global positioning system (GPS) generated map identifying a travel route taken by a first automobile vehicle having a first operator;
   continuously applying a set of GPS coordinate data to identify a current location of the first automobile vehicle;
   recording camera imaging data using a camera system along the travel route taken by the first automobile vehicle;
   adding an audio data input by the first operator including voice data to the annotated-recorded-route, such that the annotated-recorded-route identifies specific coordinates or locations along the travel route driven by the first automobile vehicle through the voice data after activating recording of the camera imaging data and applying the GPS coordinate data to any entry made by the first operator in real-time to generate annotated features along the annotated-recorded-route;
   sharing the annotated-recorded-route with a second automobile vehicle having a second operator; and
   displaying the annotated-recorded-route to the second operator using an augmented reality head-up display (HUD) of the second automobile vehicle, the augmented reality HUD presenting a highlighted upcoming travel portion of the travel route overlayed on a windshield of the second automobile vehicle, wherein as the second automobile vehicle encounters the annotated features identified by the first operator of the first automobile vehicle, a symbol on the augmented reality HUD of the second automobile vehicle is overlayed on an object viewable through the windshield of the second automobile vehicle, wherein the symbol corresponds to an annotation of the annotated features identified by the first operator.

15. The method of claim 14, further including initiating a start recording step when a first keyword is received from the first operator wherein operation of the camera system is initiated to begin collecting the camera imaging data from a front directed camera, and operation of a microphone array is initiated to receive and record the voice data.

16. The method of claim 15, further including conducting an annotation step to annotate a GPS location together with the camera imaging data from the camera system and the voice data from the microphone array.

* * * * *